United States Patent Office 3,847,849
Patented Nov. 12, 1974

3,847,849
WATER SOLUBLE RESINS AND PROCESS FOR THE PREPARATION THEREOF
Heinrich Lackner, Graz, Austria, assignor to Vianova-Kunstharz, A.G., Vienna, Austria
No Drawing. Filed Jan. 16, 1968, Ser. No. 698,108
Claims priority, application Austria, Jan. 19, 1967,
A 541/67
Int. Cl. C08g 37/16, 37/32, 53/18
U.S. Cl. 260—19 EP               25 Claims

ABSTRACT OF THE DISCLOSURE

Improved water soluble resins particularly suitable for use in electrodeposition processes and a process for their preparation are described. The resins comprise the reaction product of (a) the reaction product of resinous epoxides and heat reactive components and (b) polly-carboxylic acids or their anhydrides, the reaction occurring through reactive hydroxyl groups. The resins are made water soluble by the addition of a nitrogen base.

FIELD OF INVENTION AND BACKGROUND

This invention is directed to improved water soluble resins, and more particularly to water soluble resins particularly suitable for use in electrodeposition processes. The resins comprise the reaction product of a resinous epoxide and a heat reactive compound to provide a compound having reactive hydroxyl groups which in turn is reacted with a polycarboxylic acid. Water solubility is obtained by the addition of a nitrogen base.

The high reactivity of compounds carrying epoxy groups enabling them to form low molecular heat reactive coating materials with a number of compounds having free or etherified hydroxymethyl groups is known. According to U.S. Pat. Nos. 2,521,911 and 2,528,359 coating materials can be produced from mixtures of epoxy compounds with condensation products of phenols, urea, melamine, etc. with aldehydes. If water soluble starting materials are used, water soluble mixtures are obtained, which can be cured at elevated temperatures. In addition to physical mixtures, pre-condensates of epoxy resins with phenolic resins, aminoplast resins or silicon resin, which are soluble in organic solvents, have attained some economic significance.

The term pre-condensation usually denotes a preliminary reaction at elevated temperatures of an epoxy resin with a suitable phenolic or aminoplast resin. During this reaction the epoxy groups preferentially react with the phenolic hydroxy groups of the phenolic resin, and in a subordinate proportion, with the methylol groups. In the case of aminoplast resins only the methylol groups react with the epoxy groups. Due to this reaction mechanism, incompatible heat reactive components may be combined.

Moreover, it is known to prepare water soluble epoxy resins by esterifying them completely with unsaturated fatty acids and to adduct maleic anhydride to the unsaturated linkages of the fatty acids. After addition of bases the products become water soluble. In a given case organic solvents can be added. A preliminary condition for this method is the complete esterification of all functional hydroxy groups, since otherwise during the adducting reaction gelation will occur.

Furthermore, it is known to partly esterify the epoxy resins with unsaturated fatty acids and to react the remaining free hydroxy groups with phthalic anhydride. After addition of suitable bases, water solubility is obtained.

The advantages of water soluble coating materials are generally known; the advantages become particularly apparent in the process of electrodeposition. However, the prior art products do not contain or only contain subordinate proportions of free hyldroxy groups. Accordingly, during the stoving process they cure due to oxidative cross-linking of the unsaturated linkages of the oil fatty acids. These products shows unsatisfactory film properties. Therefore, the film properties are improved by additions of heat reactive resins. However, when using such mixtures for electrodeposition, the deficiencies apparent with many other resins occur, such as disproportioning of the bath, uneven surfaces, and the like.

OBJECTS AND GENERAL DESCRIPTION OF INVENTION

Accordingly, it is a primary object of the present invention to provide improved resins, and a process of preparing the resins, which can be rendered water soluble and which will not have the disadvantages of many prior art water soluble resinous systems. The products and process are characterized in that a compound carrying a maximum of two epoxy groups and having a molecular weight of from 200–3,000, preferably 200–1,000, is reacted at elevated temperatures with a heat reactive component to form a water insoluble epoxy-free reaction product having reactive hydroxyl groups. The reaction product is reacted with polybasic carboxylic acids and the compound is made water soluble through the addition of inorganic and/or organic nitrogen bases. A homogeneous resin is produced, which has hardening and plasticising properties and which is emminently suitable for electrodeposition. It is evident that the products of the present process can be applied by all other methods of application, such as dipping, spraying, flow coating, etc. On stoving the products form films having extreme mechanical and chemical resistance.

Since in the reaction of the epoxy compound (resin component I) and the heat reactive compound (resin component II) the epoxy groups of resin I preferentially take part in the reaction, the hydroxy groups which are preferably present in great number in resin I, partly as a result of opening the oxirane ring by its reaction, remain free for further reaction. As a result, the hydroxy-rich reaction product of resin components I and II not only can react with polybasic carboxylic acids or their anhydrides, but also cross-link with the reactive groups of resin II during the stoving process. The neutralized resin has— in contradistinction to the mentioned prior art apolar products with little hydroxy content—excellent compatibility with pigments. On storage in highly diluted form the pigments do not settle-out, eliminating a serious problem of the prior art resin systems.

The epoxy compounds suitable for use in the present invention are polyethers containing epoxy groups obtained by the etherification of a dihydric alcohol or diphenol with epichlorohydrin in the presence of alkalis. These compounds can be obtained from glycols, such as ethylene glycol, diethylene glycol, triethylene glycol, propylene glycol-1,2, propylene glycol-1,3, butylene glycol-1,4, pentane diol-1,5, hexane diol-1,6, and particularly from diphenols, such as resorcinol, brenzcatechol, hydroquinone, 1,4 - dihydroxy-naphthalene, bis - (4 - hydroxyphenyl)-methane, bis-(hydroxyphenyl) - methylphenyl-methane, bis-(4-hydroxyphenyl)-tolylmethane, 4,4'-dihydroxydiphenyl and 2,2-bis-(4-hydroxyphenyl)-propane.

The polyethers carrying epoxy groups have the following general formula:

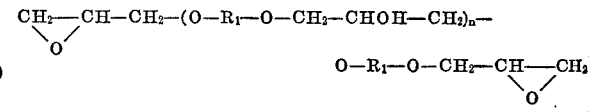

wherein $R_1$ designates an aliphatic or aromatic hydrocarbon radical and $n$ is zero or a positive integer of from 1–10. Of special importance are polyethers containing epoxy groups of the general formula:

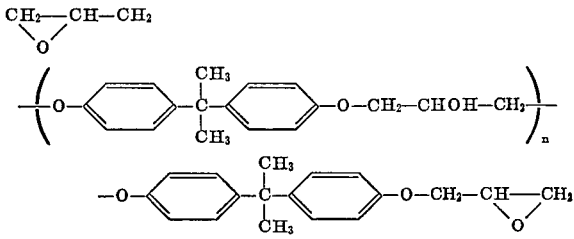

obtained by the reaction of 2,2-bis (4-hydroxyphenyl)-propane and epichlorohydrin in an alkaline medium. Polyethers of the aforesaid types will preferably have a molecular weight of from about 400 to 3,000.

For electrophoretic coating materials preferably polyethers having a molecular weight of from 300 to about 1,000 are used. Polyethers with a higher molecular weight can be employed, however, processing is somewhat difficult due to the high initial viscosity of the resin systems. For the conventional methods of application higher molecular weight polyethers are preferred.

Other examples of polyethers which can be used are described in DAS 1,148,496 and DBP 1,138,542. These resins are produced by the reaction of novolaks based on phenol, cresol, xylenol or bisphenols with epichlorohydrin. Epoxy compounds also suitable for the present invention and having a molecular weight of up to about 3,000 are mentioned in "Epoxyverbindungen und Epoxyharze," by A. M. Paquin, Springer Verlag 1958, Berlin, Gottingen, Heidelberg.

The heat reactive resins (resin component II above) suitable for the present invention are phenolic resins, melamine resins or urea resins, as well as various etherified or non-etherified methylol compounds of co-polymers of acrylamide and methacrylamide, as well as silicone resins with free or substituted hydroxy groups. The preferred phenolic resins are produced in known manner from simple or substituted phenols with one or more nuclei, or of their carboxylic acid derivatives, by alkaline condensation with aldehydes, preferably formaldehyde. A pronounced improvement of the properties of the products of the invention is obtained, if the methylol groups of the phenol formaldehyde resins are etherified with mono- or polyhydric alcohols, such as butanol or trimethylol propane. Thereby the curing tendency of the films is retarded, which means that the film obtained by electrophoretic deposition is very homogeneous and even. A further advantage of an etherification of the methylol groups is the fact that due to the substitution only the phenolic hydroxy groups react with the epoxy groups. Such products yield films having exceptional alkali-resistance. Novolak-like compounds, including when in a partially etherified state, can also be used in the reaction with the epoxy resin component I.

If non-etherified phenol-formaldehyde condensation products are used, e.g., in order to achieve a high reactivity for the curing reaction, the epoxy resin molecule should contain a maximum of one epoxy group to prevent possibility of gelation during the formation of the precondensate. The reduction of epoxy groups is effected in a simple manner, e.g., by reacting the epoxy groups partially or completely with unsaturated fatty acids, preferably with conjugated double bonds. The resultant compound is reacted with the phenolic compound. In many cases it is possible to achieve substitution and reaction with the phenol in situ at temperatures between 100 and 200° C. The reaction of resin I with resin II is carried out at a temperature of from 60 to 200° C., until no free epoxy groups are present. The ratio of the two components is such that for each original epoxy group one phenolic hydroxy group is present. The reaction can also be carried out in the presence of inert solvents, e.g., diethylene glycol diethyl ether, etc.

If melamine resins, urea resins or benzoguanamine resins are used as component II, the high reactivity of such compounds, even if they are highly etherified with mono- or polyhydric alcohols, has to be considered. Products obtained from these starting materials can be cured at from 80° C. upwards if they have been deposited electrophoretically, without showing a yellowing tendency.

The reaction products of resin I and II, containing reactive hydroxy groups, are reacted with polybasic carboxylic acids or their anhydrides. Polybasic carboxylic acids suitable for use in the present invention, alone or in mixtures, are saturated or unsaturated di, tri- and polybasic carboxylic acids or anhydrides, such as oxalic acid, adipic acid, maleic acid, phthalic acid, trimellitic acid, maleic anhydride and phthalic anhydride. Polybasic carboxylic acids or anhydrides preferred in the present process are adducts of $\alpha,\beta$-ethylenically unsaturated dicarboxylic acids or anhydrides with fatty acids or mixtures of fatty acids, such as oleic acid, linolenic acid, the fatty acids of cotton seed oil, perilla oil, tung oil, oiticica oil, linseed oil, soya oil, dehydrated castor oil, tall oil fatty acids and rosin acids, and also their esters with diols, triols and polyols, alone or in combination with rosin acids, in their original form or in polymerised form. It is particularly advisable to polymerize the adduct-forming compounds, if the functionality of this material is to be increased without changing the ratio of fatty acid to anhydride. Due to this measure, highly functional products with numerous anhydride groups in the molecule can be produced, which have, at the same time, a high content of oil.

In the production of the adduct the ratio of maleic anhydride to the adducting compound can be varied greatly. Since in most cases natural drying oils are used, the resulting adduct will also serve to plasticize the films. Optimal mechanical film properties are achieved with a ratio of maleic anhydride to oil of between 1:2 and 1:6, and preferably 1:4. The adduct is formed in a known manner. It can be advisable to hydrolyze the anhydride groups of the adduct before it is reacted with the precondensate. In addition to the above, the low molecular weight co-polymers of styrene and maleic anhydride with from 2–8 anhydride groups in the molecule can be used in the present process.

The conditions for the reaction of the precondensate of resin I and II with the polybasic carboxylic acid are such that the molecular size is substantially a result of the two reaction components without further esterification reactions. The preferred reaction temperature lies in the range of from 70–150° C. Depending upon the reactants used, an alkaline catalyst can be employed. This catalyst accelerates the formation of the final product which is water soluble upon neutralization. The reaction can be carried out in the presence of inert water tolerant solvents, such as diethylene glycol diethyl ether. The weight ratio between the precondensate and the polybasic carboxylic acid is such that the acid number of the reaction product before it is neutralized lies between 40 and 150 and has a viscosity of between 60 and 200" DIN cup no. 4/20° C. (50 percent solid content, dissolved in ethylene glycol monobutyl ether).

The reaction products are neutralized with inorganic and organic bases, alone or in mixtures. Nitrogen bases, such as ammonia, triethyl amine, diethyl amine, trimethyl amine, piperidine, morpholine, dimethyl ethanol amine, diethanol amine, triethanol amine, ethylene diamine, diethylene triamine, triethylenetetramine, pentamethylendiamine, and polyhydroxy polyamines, such as N,N,N',N', N''-pentakis-(2-hydroxypropyl) - diethylene triamine are preferred. The product becomes water soluble at a pH-value of 6.5; with a pH-value of 7.0–7.5 the obtained solutions are clear. Water tolerant organic solvents can be co-employed.

Having described the invention in general terms, the following examples are being set forth to more fully illustrate the invention, but are not to be construed as limiting the scope thereof. In the examples, parts are by weight unless specifically indicated to be otherwise.

Example 1

(a) Precondensate: The pH-value of 175 grams aqueous formaldehyde (37 percent) is adjusted to 8.0 with triethyl amine and the solution heated. At 40° C. 150 grams para tertiary butyl phenol are dissolved therein. The temperature is raised to 85–90° C. and held until at least 1.7 mols of formaldehyde have reacted. The aqueous top layer is removed.

240 grams butylphenol resol, obtained as above from 150 grams para tertiary butyl phenol, are dissolved in 200 grams n-butanol and the pH is adjusted to 3.0 with about 5–10 grams of a 20 percent aqueous solution of phosphoric acid. The mixture is heated to boiling temperature. By azeotropic distillation the reaction water and the water still present in the resol is removed. Etherification is carried on until one methylol group is etherified. The phosphoric acid is precipitated with calcium hydroxide, the precipitate is filtered off and the solvent is removed by vacuum distillation.

600 grams of the butylated butylphenol resol and 1050 grams of an epoxy resin, obtained in known manner from 2,2-bis(4-hydroxy-phenyl)-propane and epichlorohydrin, with an epoxy equivalent of 450–525 and a melting range of 64–67° C. are held at 100–110° C. until no free epoxy groups can be traced. The reaction product is dissolved with 520 grams diacetone alcohol to obtain a solid content of 80 percent.

(b) Carboxy Compound: 250 grams linseed oil, first quality, and 100 grams dehydrated castor oil are heated to about 200° C. together with 100 grams maleic anhydride. The temperature is held until no free maleic anhydride can be traced.

The mass is cooled to 90° C. and a mixture of 18 grams water and 2 grams triethyl amine is added in portions. The product is held at 90–95° C. for about two hours until no free anhydride groups are present.

(c) Reaction of (a) and (b): 470 grams carboxylic compound 1 (b), prepared from 100 grams maleic anhydride, are heated to 105° C. and 300 grams precondensate 1 (a) are added. The temperature is slowly raised to 130° C. and held until a sample of the resin has become completely water soluble upon addition of triethyl amine. The reaction temperature is further held until a viscosity of 90–150″ DIN cup no. 4/20° C. is reached, which is the preferred range for obtaining optimal film properties. The viscosity is measured at a 50 percent solution in ethylene glycol monobutyl ether.

The resin is diluted with 140 grams ethylene glycol monobutyl ether and 80 grams ethylene glycol monoethyl ether, and is neutralized with a mixture of 205 grams water and 37 grams diethyl amine. A pH-value of 7.0–7.5 and a solid content of 60 percent is obtained. The film of a resin solution which has been diluted with water to 30 percent solids can be stoved at 180° C. and exhibits fast curing and a high gloss, very resistant film. Upon further dilution with water the resin is suitable for electrodeposition.

(d) Electrodeposition: 166 grams resin solution 1 c., containing 100 grams resin solids, are ground with 35 grams red iron oxide on a triple roller mill and are diluted with deionized water to a resin solid content of 10 percent. The conductivity of the paint is 1200 µS at a pH-value of 7.2 at 25° C.

The anodic deposition is carried out at an electrode distance of 50 mm. and a voltage of 300 v. direct current for 60 minutes. The coated anode is rinsed with deionized water and stoved at 180° C. for 30 minutes. The obtained film has a thickness of about 20µ, excellent mechanical properties and outstanding salt spray resistance.

Example 2

(a) Precondensate: In a suitable reaction vessel 280 grams dehydrated castor oil fatty acid (1 mol) are heated to 160° C. (with inert gas) and 1050 grams of the epoxy resin mentioned in Example 1 are added slowly. The temperature is held at 160° C. until the acid value has fallen below 1 mg. KOH/g. Then 240 grams butyl phenol resol, prepared according to Example 1 from 150 grams para tertiary butyl phenol are added slowly to avoid the formation of foam, and the temperature is raised to 180° C. at a rate of 10° C./hour. The temperature is held at 180° C. until the viscosity of a 50 percent solution in diacetone alcohol has reached 350–400″ DIN cup no. 4. Then the mass is cooled below 120° C. and diluted with diacetone alcohol to a solid content of 78 percent.

(b) Carboxy Compound: 265 grams linseed oil and 135 grams dehydrated castor oil are heated to 280° C. until a viscosity of 90–100″ DIN cup no. 4/20° C. is reached. At 200° C. 100 grams maleic anhydride are added. The temperature is held at 200° C. for about two hours until 90 percent of the maleic anhydride has reacted. Then 75 grams tung oil are added and the temperature is held at 190–200° C. until no free maleic anhydride is present.

(c) Reaction of (a) and (b): 575 grams of the carboxylic compound 2(b) are mixed with 18 grams water and 1 gram diethyl amine and held at 100–120° C. until the infra-red spectrum shows no free anhydride groups. Then 325 grams precondensate 2(a) are added and the temperature held at from 100–110° C. until a viscosity of 450–500 cp./20° C. as a 50 percent solution in ethylene glycol monobutyl ether is reached. The resin is diluted with 200 grams ethylene glycol monoisopropyl ether. After cooling to room temperature it is neutralized with a mixture of 35 grams diethyl amine and 230 grams water. A solid content of 60 percent is obtained. If necessary, the pH-value is adjusted with from 2–6 grams diethyl amine to a pH-value of 7.0–7.5. The neutralized resin solution is infinitely dilutable with water. The resin solution is diluted with equal parts of water and a film stoved at 170–180° C. is very flexible, hard, shows good gloss and resistance. After dilution to 10 percent solids with water, the resin can be deposited electrophoretically as a clear varnish or pigmented. The pigmented paints do not show pigment coagulations. The pigment binder ratio of the bath remains stable over long periods of electrodeposition.

Example 3

(a) Precondensate: 1050 grams of the epoxy resin mentioned in Example 1 are dissolved in 400 grams diethylene glycol diethyl ether. Then 510 grams of a butylated melamine resin produced in known manner (80 percent solids, produced from 100 grams melamine) and 180 grams of a synthetic fatty acid in which 90 percent of the carboxy groups are attached to a tertiary carbon atom, with an acid number of 300 mg. KOH/g. are added. The temperature is raised to 110–120° C. and held until the mass has become clear. After addition of 1 gram triethylamine, the temperature is held at 110–120° C. for about two additional hours, whereby the acid value falls below 1 mg. KOH/g. and no free epoxy groups are present. The mass is diluted with 180 grams diethylene glycol diethyl ether, producing a solid content of 70 percent.

(b) Carboxy Compound: 200 grams soya oil, 280 grams distilled dehydrated castor oil fatty acid and 36 grams pentaerythritol are esterified at 220–240° C., using xylol as an azeotropic solvent, until the acid number has fallen below 5 mg. KOH/g. Then 100 grams maleic anhydride are added and the temperature is held at 200–220° C. until no free maleic anhydride is present.

(c) Reaction of (a) and (b): 600 grams carboxy compound 3(b) are dissolved with 120 grams diethylene glycol diethyl ether and 300 grams melamine precondensate 3(a) are added. The temperature is held at 70–90° C. until a sample has become completely water soluble upon addition of triethylamine. The acid value of the final product is 120–140. The mass is mixed with 80 grams triethylamine and 250 grams water. The final product has a solid content of 60 percent and a pH-value of 7.5–8.0.

After further dilution with water, paints can be produced therefrom which will cure at 120–140° C. without yellowing. After dilution with more water the paints can be used for electrodeposition.

Example 4

(a) Precondensate: 170 grams of the synthetic fatty acid mentioned in Example 3 are heated to 120° C. together with 490 grams diethylene glycol diethyl ether. At this temperature 1050 grams of the epoxy resin mentioned in Example 1 are added. At 90° C. 430 grams of a butylated urea resin (60 percent in n-butanol) are added in which 0.8–1.0 mole n-butanol are etherified per mole of urea dialcohol. The temperature is raised to 120° C. and held for two hours. After cooling to 90° C., 0.5 grams triethylamine are slowly added with 9 grams diethylene glycol diethyl ether. The temperature is held at 120° C. until the acid value has fallen below 1 mg. KOH/g. The final product has a solid content of 70 percent.

(b) Carboxy Compound: 700 grams of a low molecular weight styrene maleic anhydride co-polymer with a molecular weight of 700 and an acid value of 415 mg. KOH/g., containing 2–3 anhydride groups, are suspended in 420 grams isooctadecanol (1.5 moles). After addition of 280 grams diethylene glycol diethyl ether and 1 gram triethylamine the mass is heated with stirring to 120° C. and held until a solution is obtained which is clear also when cold.

(c) Reaction of (a) and (b); 1400 grams of carboxy compound 4(b) are heated to 100° C. and 400 grams precondensate 4(a) are added. The temperature is held at 120° C. until a sample is completely soluble in water after addition of triethylamine. Upon dilution with water to 30 percent and eventual pigmentation, stoving enamels are obtained which cure up to 170° C. without yellowing. After adequate dilution with water the paints can also be applied by electrodeposition as described in Example 1.

As will be apparent to one skilled in the art, numerous modifications can be made in the utilization of the process for preparing water-soluble compositions and in the water-soluble compositions without departing from the inventive concept herein described. Such modifications being within the ability of one skilled in the art are intended to be covered herein with the invention only being limited by the appended claims.

It is claimed:

1. A process for producing water soluble synthetic resins comprising the steps:
    (A) forming a water insoluble epoxy-free precondensate having reactive hydroxyl groups by reacting at an elevated temperature;
        (1) a polyepoxide having an ether linkage and a maximum of two epoxide groups per molecule, said polyepoxide having a molecular weight of from 200 to 3,000.
        (2) a heat reactive compound comprising a thermosetting material having a reactive hydroxyl group to preferentially react with said epoxide group selected from the group consisting of phenolic resins, aminoplast resins which are aldehyde condensation products of melamine, guanamines, urea, unetherified or etherified with mono- or polyhydric alcohols, and etherified and non-etherified methylol compounds of acryl amide and methacryl amide polymers,
    (B) thereafter reacting the precondensate formed in (A) with a polycarboxylic acid having at least two carboxyl groups per molecule or anhydrides of said acid, the weight ratio between the precondensate and the polycarboxylic acid being sufficient to produce a reactive product having an acid number of from about 40 to 150;
    (C) solubilizing the water insoluble reaction product of (B) by adding a nitrogen base thereby neutralizing the free carboxyl groups.

2. The process of claim 1 wherein the polyepoxide has a molecular weight of from 200 to 1,000.

3. The process of claim 2 wherein the polycarboxylic acid is an adduct of $\alpha,\beta$-ethylenically unsaturated dicarboxylic acids, or an anhydride of said acids, with unsaturated fatty acids, fatty acid esters, and mixtures thereof.

4. A water soluble synthetic resin having an acid number of from about 40 to 150 comprising:
    the reaction product of a precondensate and a polycarboxylic acid or an anhydride of said acid;
        (1) said precondensate being formed from the reaction between a polyepoxide and a heat reactive compound, said polyepoxide having an ether linkage therein, a maximum of two epoxide groups per molecule and a molecular weight of from about 200 to 3,000, said heat reactive compound comprising a thermosetting material having a reactive hydroxyl group to preferentially react with said epoxide group selected from the group consisting of phenolic resins, aminoplast resins which are aldehyde condensation products of melamine, guanamines, urea, unetherified or etherified with mono- or polyhydric alcohols, and etherified and non-etherified methylol compounds of acryl amide and methacryl amide polymers,
        (2) said polycarboxylic acid taken from the group of carboxylic acids having at least two carboxyl groups per molecule, and anhydrides of said carboxylic acids,
        (3) the weight ratio between reactants (1) and (2) being sufficient to produce said precondensate-polycarboxylic acid reaction product having said acid number,
    said reaction product being water insoluble and rendered water soluble by neutralizing with a nitrogen base.

5. The composition of claim 4 made water soluble by the addition of an amine base.

6. The composition of claim 4 wherein the heat reactive compound is selected from the group consisting of phenolic resins and aminoplast resins.

7. The composition of claim 6 made water soluble by the addition of an amine base.

8. The composition of claim 4 wherein the polycarboxylic acid is an adduct of $\alpha,\beta$-ethylenically unsaturated dicarboxylic acids, or an anhydride of said acids, with an unsaturated fatty acid or fatty acid ester.

9. The reaction product of claim 8 wherein the $\alpha,\beta$-ethylenically unsaturated dicarboxylic acid is maleic anhydride.

10. The composition of claim 8 wherein the adduct includes a co-polymer of maleic anhydride and at least one vinyl substituted benzene monomer.

11. The composition of claim 4 wherein the polycarboxylic acid is a co-polymer of maleic anhydride and at least one vinyl substituted benzene monomer.

12. The composition of claim 8 made water soluble by the addition of an amine base.

13. The process of claim 1 wherein the heat reactive compound is selected from the group consisting of phenolic and aminoplast resins.

14. The process of claim 1 wherein the heat reactive compound is a co-polymer of an acrylamide and a vinyl substituted benzene monomer and its etherified products with mono or polyhydric alcohols.

15. The process of claim 1 wherein the polycarboxylic acid is an adduct of $\alpha,\beta$-ethylenically unsaturated dicarboxylic acids, or an anhydride of said acids, with an unsaturated fatty acid or fatty acid ester.

16. The process of claim 15 wherein said $\alpha,\beta$-ethylenically unsaturated dicarboxylic acid is maleic anhydride.

17. The process of claim 1 wherein the polycarboxylic acid is a co-polymer of maleic anhydride and at least one vinyl substiuted benzene monomer.

18. The process of claim 17 wherein said polycarboxylic acid is a maleic acid-styrene co-polymer.

19. The composition of claim 4 wherein the heat reactive compound is a co-polymer of an acrylamide and a vinyl substituted benzene monomer and its etherified product with mono- or polyhydric alcohols.

20. The composition of claim 19 made soluble by the addition of an amine base.

21. The composition of claim 10 wherein said adduct includes a co-polymer of maleic anhydride and styrene.

22. The composition of claim 11 wherein said polycarboxylic acid co-polymer comprises maleic anhydride and styrene.

23. A method for preparing water-dilutable, heat-curable coating compositions comprising:

(I) forming a water insoluble epoxy free reaction product having reactive hydroxyl groups by precondensing by heating at a temperature of 60 to 200° C. compounds containing epoxy groups or hydroxyl groups consisting of epoxy resins of the general formula:

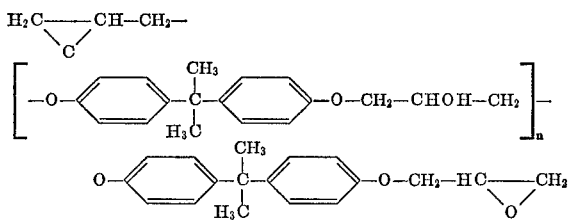

having molecular weights of between about 400 and 3000 with a heat-curable, water-dilutable low molecular weight condensation product selected from the group consisting of phenoplast resins and aminoplast resins;

(II) reacting the precondensate of step I at a temperature of from 70 to 150° C. with an adduct of maleic acid or anhydride with an unsaturated fatty acid or oil the weight ratio between the unsaturated fatty material and the maleic material ranging from 2:1 to 6:1 and the weight ratio between the precondensate and the adduct is such that the acid number of the reaction product before it is neutralized lies between 40 and 150 and has a viscosity of between 60 and 200" DIN cup no. 4/20° C. measured as a 50 percent solids solution in ethylene glycol monobutyl ether;

(III) neutralizing the product of step II with a basic material selected from the group consisting of ammonia and strong organic nitrogen bases; and (IV) diluting the neutralizing product with water.

24. The method of claim 23 wherein said fatty acids are selected from the group consisting of dehydrated castor oil fatty acids, tall oil fatty acids and mixtures thereof.

25. The product obtained by the process of claim 23.

References Cited

UNITED STATES PATENTS

| | | | |
|---|---|---|---|
| 3,567,668 | 3/1971 | Golden Pfennig | 260—29.3 X |
| 3,245,925 | 4/1966 | Watson | 260—835 |
| 3,308,077 | 3/1967 | Pattison et al. | 260—23 |
| 3,012,485 | 12/1961 | Bradley | 94—22 |
| 2,848,431 | 8/1958 | Dean et al. | 260—19 |
| 2,897,165 | 7/1959 | Rowland et al. | 260—19 |
| 3,401,130 | 9/1968 | Kort et al. | 260—23 |

FOREIGN PATENTS

| | | | |
|---|---|---|---|
| 711,539 | 7/1954 | Great Britain | 260—23 |

DONALD E. CZAJA, Primary Examiner

C. WARREN IVY, Assistant Examiner

U.S. Cl. X.R.

204—181; 260—20, 21, 29.2 EP, 29.3, 29.4 UA